(12) United States Patent
Dong et al.

(10) Patent No.: US 9,313,663 B2
(45) Date of Patent: Apr. 12, 2016

(54) AUTOMATIC DIVISION OF INTERNET PROTOCOL RADIO ACCESS NETWORKS TO INTERIOR GATEWAY PROTOCOL AREAS

(71) Applicant: Futurewei Technologies, Inc., Plano, TX (US)

(72) Inventors: Xuesong Dong, Pleasanton, CA (US); Ming Li, Cupertino, CA (US); Younghui Wu, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 92 days.

(21) Appl. No.: 14/465,210

(22) Filed: Aug. 21, 2014

(65) Prior Publication Data

US 2016/0057629 A1    Feb. 25, 2016

(51) Int. Cl.
| | | |
|---|---|---|
| *H04L 12/28* | (2006.01) | |
| *H04W 16/10* | (2009.01) | |
| *H04W 16/30* | (2009.01) | |
| *H04W 48/16* | (2009.01) | |
| *H04L 12/46* | (2006.01) | |
| *H04W 84/14* | (2009.01) | |
| *H04W 88/16* | (2009.01) | |

(52) U.S. Cl.
CPC ........... *H04W 16/10* (2013.01); *H04L 12/4637* (2013.01); *H04W 16/30* (2013.01); *H04W 48/16* (2013.01); *H04W 84/14* (2013.01); *H04W 88/16* (2013.01)

(58) Field of Classification Search
CPC ..................................................... H04W 16/10
USPC .......................................................... 370/254
See application file for complete search history.

(56) References Cited

U.S. PATENT DOCUMENTS

| | | | | |
|---|---|---|---|---|
| 2009/0190541 A1* | 7/2009 | Abedi | ................... | H04W 16/10 370/329 |
| 2012/0215876 A1* | 8/2012 | Ohtake | ............... | H04L 41/0893 709/208 |
| 2013/0215789 A1* | 8/2013 | Lim | ........................ | H04L 45/04 370/254 |
| 2014/0307744 A1* | 10/2014 | Dunbar | ................... | H04L 45/44 370/401 |
| 2014/0348028 A1* | 11/2014 | Chen | ..................... | H04L 12/437 370/258 |
| 2015/0023156 A1* | 1/2015 | Csaszar | ................... | H04L 45/22 370/228 |

(Continued)

OTHER PUBLICATIONS

Pothen, A., et al., "Partitioning Sparse Matrices with Eigenvectors of Graphs," NASA Systems Division, Jul. 25, 1989, 31 pages.

(Continued)

*Primary Examiner* — Melvin Marcelo
*Assistant Examiner* — Peter Solinsky
(74) *Attorney, Agent, or Firm* — Conley Rose, P.C.; Grant Rodolph; William H. Dietrich

(57) ABSTRACT

A network component to partition an Internet Protocol (IP) Radio Access Network (RAN) network. The network component may be configured to find one or more rings and one or more chains. The rings and/or the chains may be used to find one or more ring clusters. The network component may be configured to divide one or more of the ring clusters if they exceed a network node threshold number of network nodes. The network node may form a plurality of interior gateway protocol (IGP) areas using the ring clusters. The plurality of IGP areas may be refined based on a network node threshold and an aggregate site gateway (ASG) node threshold.

18 Claims, 11 Drawing Sheets

(56) References Cited

U.S. PATENT DOCUMENTS

2015/0381483 A1* 12/2015 Kompella ............ H04L 41/0896
370/258
2015/0381500 A1* 12/2015 Kompella ............... H04L 45/50
370/231

OTHER PUBLICATIONS

Schloegel, K., et al., "Parallel Static and Dynamic Multi-Constraint Graph Partitioning," Concurrency and Computation: Practice and Experience, May 14, 2001, 22 pages.
Karypis, G., et al., "Multilevel Algorithms for Multi-Constraint Graph Partitioning," May 5, 1998, 25 pages.
Jacokes, B., et al., "Lecture notes on Multiway cuts and k-cuts," Feb. 28, 2006, 4 pages.
Jain, S., et al., "Greedy Algorithms for k-way Graph Partitioning," Sep. 2000, 8 pages.
Johnson, D., "Finding All the Elementary Circuits of A Directed Graph," vol. 4, No. 1, Mar. 1975, 8 pages.
Tarjan, R., "Enumeration of the Elementary Circuits of A Directed Graph," TR 72-145, Sep. 1972, 16 pages.
Guttmann-Beck, N., et al., "Approximation Algorithms for Minimum K-Cut," Sep. 4, 1997, pp. 198-207.
Tiernan, J., "An Efficient Search Algorithm to Find the Elementary Circuits of a Graph," Communications of the ACM, vol. 13, No. 12, Dec. 1970, pp. 722-726.
Karypis, G., et al., "A Fast and High Quality Multilevel Scheme for Partitioning Irregular Graphs," Mar. 27, 1998, 28 pages.

* cited by examiner

AUTOMATIC DIVISION OF INTERNET PROTOCOL RADIO ACCESS NETWORKS TO INTERIOR GATEWAY PROTOCOL AREAS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Internet Protocol (IP) Radio Access Network (RAN) network may comprise tens of thousands of network nodes. An IP RAN network may be divided into a plurality of Interior Gateway Protocol (IGP) areas because of IGP protocol limitations, such as, scalability issues. Manually dividing IP RAN networks into IGP areas may be difficult when a network comprises a large number of network nodes. A centralized controller with a global view of an IP RAN network may be employed to obtain network topology information. However, efficiently dividing the IP RAN network into a plurality of IGP areas may be a non-deterministic polynomial time (NP)-complete problem. Dividing the IP RAN network may also affect other existing IGP areas. As such, there may be a need for efficiently dividing an IP RAN network into a plurality of IGP.

SUMMARY

In one example embodiment, the disclosure includes a network component to partition an IP RAN network that comprises one or more rings. The network component may be configured to find one or more rings and one or more chains within the IP RAN network. The rings and/or the chains that share links may be classified as one or more ring clusters. The network component may be configured to divide one or more of the ring clusters if they exceed a network node threshold number of network nodes. The network node may form a plurality of IGP areas using the ring clusters. The plurality of IGP areas may be refined based on one or more IGP area requirements.

In another example embodiment, the disclosure includes a centralized controller configured to partition an IP RAN network that comprises a plurality of network nodes. The centralized controller may be configured to find one or more ring clusters that comprise at least some of network nodes. The ring clusters may be partitioned when they exceed a maximum number of network nodes. The centralized controller may form a plurality of IGP areas using the ring clusters. One or more of the plurality of IGP areas may be refined based on a network node threshold which may provide an upper limit to the number of network nodes in an IGP area and an aggregation site gateway (ASG) node threshold which may provide redundancy in the event of a network node failure.

In yet another example embodiment, the disclosure includes a network component to partition an IP RAN network by finding one or more ring clusters, a ring set for the ring clusters, and to generate a ring cluster database graph using the ring set. The ring cluster database graph may be partitioned using a dynamic k-cut algorithm. The network component may be configured to form a plurality of IGP areas using the ring clusters. One or more of the IGP areas may be refined based on a network node threshold and an ASG node threshold. The network component may also be configured to communicate topology information about the IGP areas.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments for dividing an IP RAN network into a plurality of IGP areas. Dividing an IP RAN network into IGP areas may comprise finding valid rings, finding valid chains, finding ring clusters, dividing ring clusters that exceed a predetermined number of network nodes, forming coarse IGP areas, and globally optimizing the IGP areas. In an example embodiment, a centralized controller may be configured to divide an IP RAN network into a plurality of IGP areas. The centralized controller may identify a plurality of network topology structures to generate one or more ring clusters. The ring clusters may be partitioned such that a total number of network nodes in an IGP area may be less than an IGP node threshold requirement. The total number of ASG nodes may be more than an ASG node threshold requirement. The IGP areas may be formed coarsely by dividing the IP RAN network and attempting to minimize the number of links shared between IGP areas. One or more IGP areas may be refined to meet one or more IGP requirements. For example, ASG nodes and cell site gateway (CSG) nodes in an area may be as close as possible on an aggregation ring and/or an access ring. An IGP area may comprise two ASG nodes that are closest to a particular CSG node. In the event of a node and/or link failure, a CSG node can still reach at least one ASG node in the same area. A generated IP RAN network may have a minimal impact on existing IGP areas.

Figure 1:
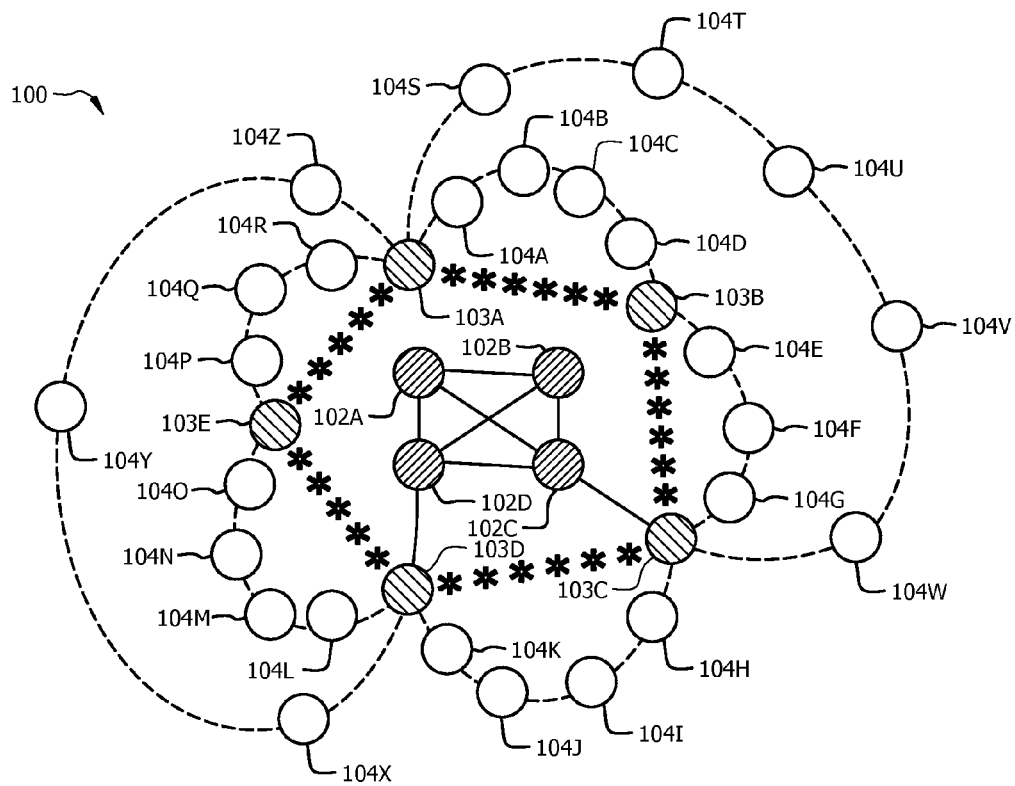
FIG. 1 is a schematic diagram of an example embodiment of a network where embodiments of the present disclosure may operate.

FIG. 1 is a schematic diagram of an example embodiment of a network 100. In one example embodiment, the network 100 may be an IP RAN network that comprises one or more rings (e.g., a ring as described in FIG. 3). The network 100 may be configured to communicate data traffic among a plurality of network nodes within the network 100. The network 100 may comprise a plurality of central office (CO) nodes 102A-102D, a plurality of ASG nodes 103A-103E, and a plurality of CSG nodes 104A-104Z. The CO nodes 102A-102D may be central offices for a network and may exchange or communicate data services (e.g., internet service or telephone service) with CO nodes 102A-102D, ASG nodes 103A-103E, and/or CSG nodes 104A-104Z. In an embodiment, an ASG node (e.g., ASG nodes 103A-103E) may be a carrier-class multiservice aggregator and may be configured to optimize cellular backhaul by multiplexing various services into a single network interface. The ASG nodes 103A-103E may be coupled to one or more CSG nodes 104A-104Z and/or to one or more CO nodes 102A-102D. The ASG nodes 103A-103E may form a plurality of aggregation rings (e.g., shown as starred lines). An aggregation ring may comprise a connection between ASG nodes. In an embodiment, a CSG node (e.g., CSG nodes 104A-104Z) may be multiservice access equipment. For example, a CSG may be located on an edge of a metropolitan network. A CSG nodes 104A-104Z may be connected to a cell tower, a customer site, an edge router, a virtual private network (VPN) client, or any other suitable network device to deliver data content as would be appreciated by one of ordinary skill in the art upon viewing this disclosure. The CSG nodes 104A-104Z may form a plurality of access rings (e.g., shown as dashed lines). An access ring may comprise two or more ASG nodes 103A-103E and one or more CSG nodes 104A-104Z. An access ring may be configured such that in the event of a link failure and/or an ASG node 103A-103E or CSG node 104A-104Z failure the CSG nodes 104A-104Z may be able to communicate data traffic with an ASG node 103A-103E.

The CO nodes 102A-102D, the ASG nodes 103A-103E, and/or the CSG nodes 104A-104Z may be in data communication with a centralized controller (e.g., a software-defined networking (SDN) controller). The centralized controller may be any type of controller that is configured to receive network topology information from the CO nodes 102A-102D, the ASG nodes 103A-103E, and/or the CSG nodes 104A-104Z and to communicate network topology information about one or more IGP areas. The centralized controller may be configured to implement one or more IP RAN network division algorithms, such as, network division method 500 as will be discussed in FIG. 5.

As persons of ordinary skill in the art may appreciate, although FIG. 1 illustrates a network 100 that comprises a plurality of CO nodes 102A-102D, a plurality of ASG nodes 103A-103E, and a plurality of CSG nodes 104A-104Z, the disclosure is not limited to only this specific application. For instance, the network 100 may comprise any suitable number of CO nodes 102A-102D, ASG nodes 103A-103E, and/or CSG nodes 104A-104Z. The CO nodes 102A-102D, ASG nodes 103A-103E, and/or CSG nodes 104A-104Z may be interconnected amongst each other to form a plurality of different network topologies. The use and discussion in FIG. 1 is only an example to facilitate ease of description and explanation.

Figure 2:
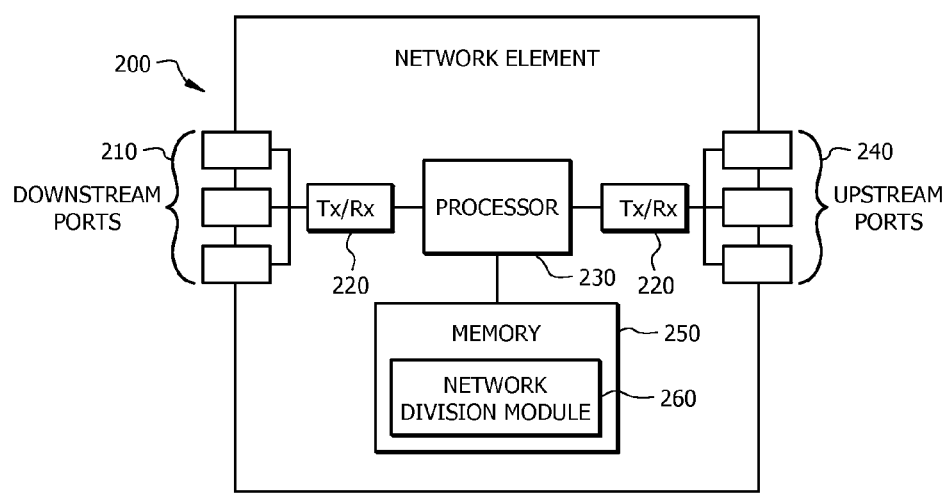
FIG. 2 is a schematic diagram of an example embodiment of a network element.

FIG. 2 is a schematic diagram of an example embodiment of a network element 200 that may be used to transport and process traffic through at least a portion of a network 100 shown in FIG. 1. At least some of the features/methods described in the disclosure may be implemented in the network element 200. For instance, the features/methods of the disclosure may be implemented in hardware, firmware, and/or software installed to run on the hardware. The network element 200 may be any device (e.g., a switch, router, bridge, server, client, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one example embodiment, the network element 200 may be an apparatus configured to implement a network division of an IP RAN network. For example, network element 200 may be or integrated within a centralized controller, an ASG node 103A-103E, or a CSG node 104A-104Z as described in FIG. 1.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another example embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine which nodes to send (e.g., transmit) the packets. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to divide an IP RAN network into a plurality of IGP areas while satisfying one or more IGP requirements.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 may comprise a network division module 260 that may be implemented on the processor 230. In one example embodiment, the network division module 260 may be implemented on a centralized controller to partition an IP RAN network. In another example embodiment, the network division module 260 may be implemented on an ASG node (e.g., ASG node 103A-103E as described in FIG. 1) or a CSG node (e.g., CSG node 104A-104Z as described in FIG. 1).

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
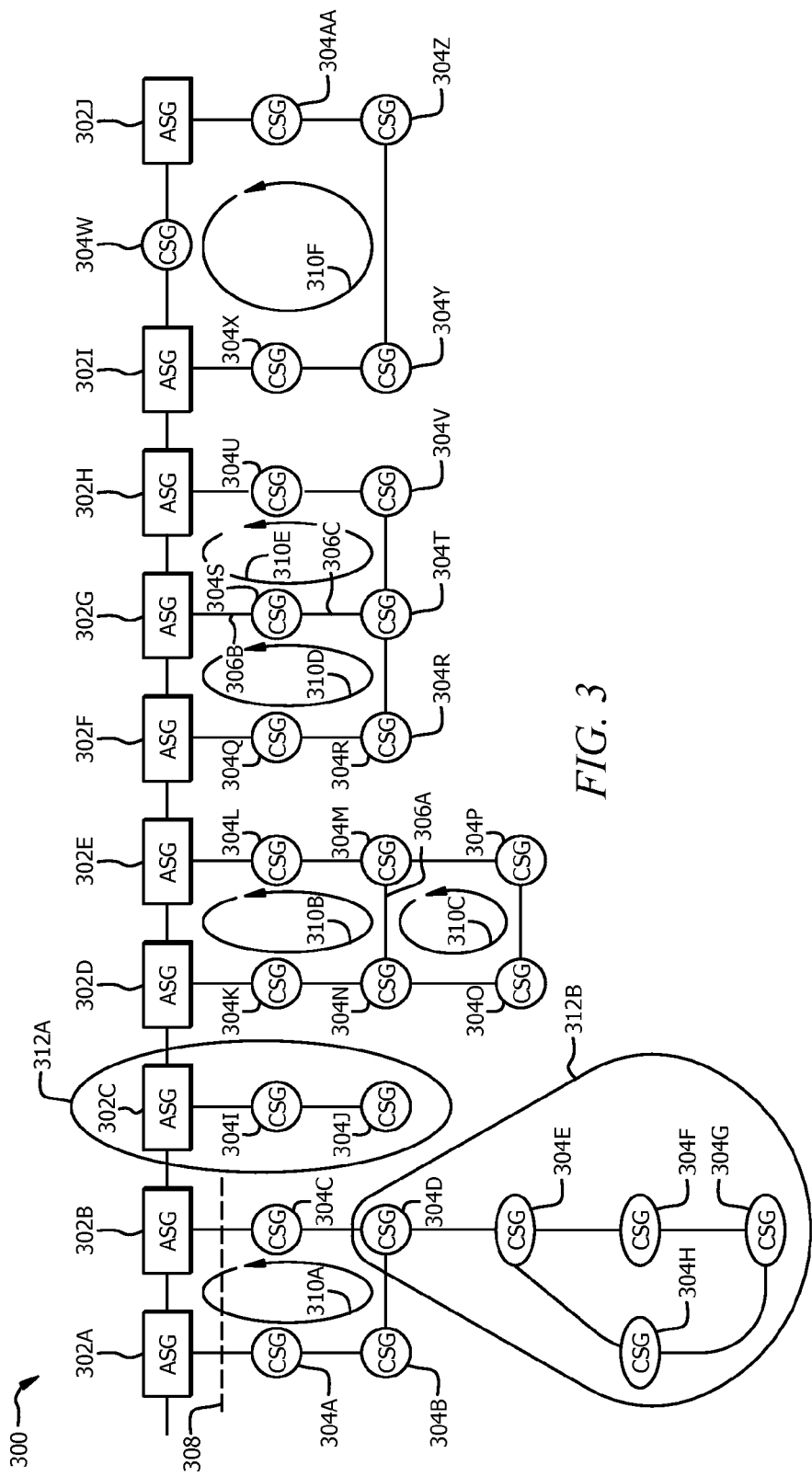
FIG. 3 is a schematic diagram of an example embodiment of a portion of a network.

FIG. 3 is a schematic diagram of an example embodiment of a portion of network 300. The portion of the network 300 comprises a plurality of ASG nodes 302A-302J and a plurality of CSG nodes 304A-304AA. The ASG nodes 302A-302J and the CSG nodes 304A-304AA may be configured to comprise one or more different network topology structures. A network topology structure may be a configuration of ASG nodes 302A-302J, CSG nodes 304A-304AA, and CSG links that is suitable for partitioning an IP RAN network. A CSG link may be a link between a CSG node 304A-304AA and an ASG node 302A-302J or a link between a CSG node 304A-304AA and another CSG node 304A-304AA.

A network topology structure may include, but is not limited to, a ring, a chain, a ring-in-ring, a conjoint ring, and combination thereof. A ring 310A may comprise ASG nodes 302A and 302B and a path formed along a plurality of CSG nodes 304A-304D. A ring may be an access ring and may be configured such that the ring may be partitioned (e.g., via partition 308) into a first half that comprises ASG nodes and a second half that comprises CSG nodes. Conversely, an invalid ring 310F may comprise ASG nodes 302I and 302J and CSG nodes 304W-304AA. An invalid ring may be a ring that cannot be partition into a first half that comprises ASG nodes and a second half that comprises CSG nodes.

A chain may comprise a head node and a plurality of CSG nodes which may pass through the head node to access other network topology structures and/or aggregate rings (e.g., aggregate ring as described in FIG. 1). A head node may be a node which all CSG nodes in a chain may pass through to access an aggregate ring. Two types of chains may exist within the portion of the network 300, an ASG chain or a CSG chain. An ASG chain 312A may comprise a head node ASG node 302C and CSG nodes 304I and 304J. An ASG chain may be configured such that the CSG nodes of the ASG chain are connected to a single ASG node (e.g., the ASG head node). A CSG chain 312B may comprise a head node CSG node 304D and CSG nodes 304E-304H. The CSG head node may be connected to one or more additional network topology structures.

A ring-in-ring may comprise a ring 310B comprising ASG nodes 302D and 302E and CSG nodes 304K-304N coupled to CSG nodes 304O and 304P that may form a CSG ring 310C comprising CSG nodes 304M-304P. The ring 310B and the CSG ring 310C may share a common CSG link 306A between CSG node 304N and 304M. A conjoint ring may comprise a ring 310D comprising ASG nodes 302F and 302G and CSG nodes 304Q-304T and a ring 310E that comprises ASG nodes 302G and 302H and CSG nodes 304S-304V. The rings 310D-310E may be configured to share ASG node 302G and CSG link 306B between ASG node 302G and CSG node 304S and CSG link 306C between CSG node 304S and 304T.

Figure 4:
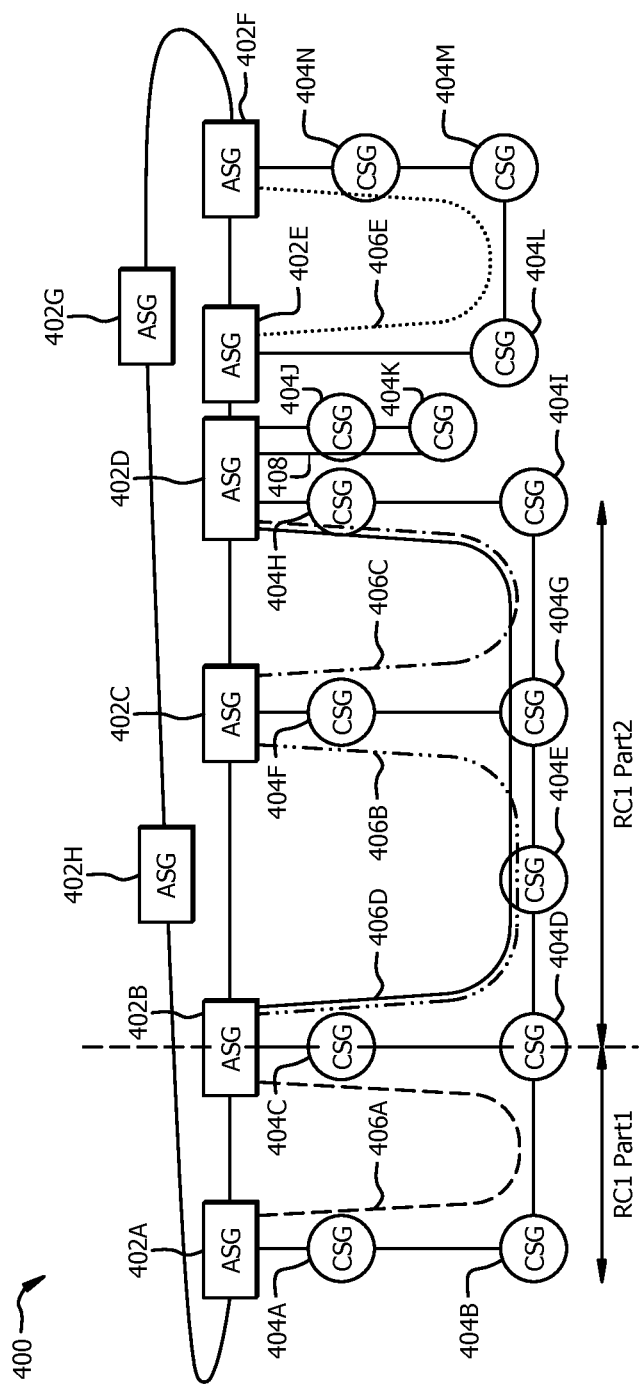
FIG. 4 is a schematic diagram of another example embodiment of a portion of a network.

FIG. 4 is a schematic diagram of another example embodiment of a portion of a network 400. The portion of the network 400 comprises a plurality of ASG nodes 402A-402H and a plurality of CSG nodes 404A-404N. The portion of the network 400 comprises a plurality of rings 406A-406E (e.g., a ring as described in FIG. 3). The rings 406A-406E comprise a first ring 406A that comprises ASG nodes 402A and 402B and CSG nodes 404A-404D, a second ring 406B that comprises ASG nodes 402B and 402C and CSG nodes 404C-404G, a third ring 406C that comprises ASG nodes 402C and 402D and CSG nodes 404F-404I, a fourth ring 406D that comprises ASG nodes 402B and 402D and CSG nodes 404C-404E and 404G-404I, and a fifth ring 406E that comprises ASG nodes 402E and 402F and CSG nodes 404L-404N. The portion of the network 400 also comprises a chain 408 (e.g., a chain as described in FIG. 3) that comprises ASG node 402D and CSG nodes 404J and 404K.

A network (e.g., network 100 as described in FIG. 1) and/or a portion of a network (e.g., a portion of a network 400 as described in FIG. 4) may be configured to meet a plurality of IGP area requirements. For example, an IGP area requirement may be that the number of network nodes (e.g., ASG nodes 103A-103E and/or CSG nodes 104A-104Z as described in FIG. 1) may be less than about a node threshold M of nodes. Each IGP area may be configured to comprise at least an ASG threshold N number of ASG nodes, for example, at least about two ASG nodes per IGP area. An IGP area may comprise a plurality of ASG nodes that are relatively adjacent (e.g., closest) to a plurality of CSG nodes. The ASG nodes and the CSG nodes within an IGP area may be as close as possible along an aggregate ring and/or an access ring. An IGP area may be configured such that a CSG node may reach at least one ASG node in the event of an ASG node or CSG node failure and/or link failure. The number of shared links within a network which belong to one or more IGP areas may be relatively minimal. An existing IGP area may be configured to experience relatively minimal impact when one or more additional IGP areas are added to the network. Additionally, an IGP area requirement may comprise any other suitable requirements as would be appreciated by one of ordinary skill in the art upon viewing this disclosure. One or more IGP area requirements (e.g., an IGP node threshold) may be set and/or determined by a network operator or administrator. For example, a network operator may use a planning tool to determine the node threshold based on the scalability of a network and/or a protocol used by the network (e.g., an intermediate system to intermediate system (IS-IS) protocol). The network operator may communicate the one or more IGP area requirements to a central controller using a computer or any other suitable device as would be appreciated by one of ordinary skill in the art upon viewing this disclosure.

Figure 5:
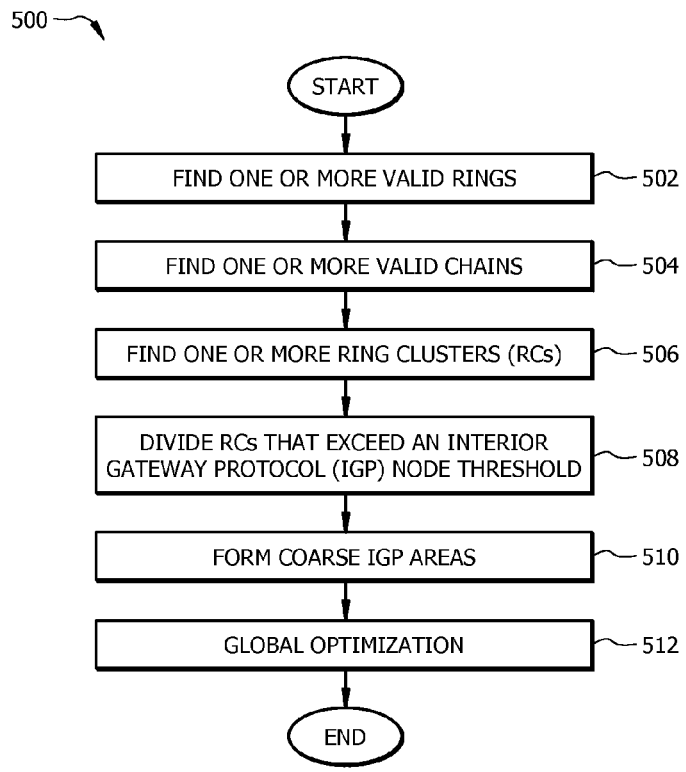
FIG. 5 is a flowchart of an example embodiment of a network division method.

FIG. 5 is a flowchart of an example embodiment of a network division method 500. In an example embodiment, method 500 may be implemented in a centralized controller, such as, an SDN controller. In another example embodiment, method 500 may be implemented in an ASG node (e.g., ASG nodes 103A-103E as described in FIG. 1) or a CSG node (e.g., CSG nodes 104A-104Z as described in FIG. 1). Method 500 may use an IP RAN network topology (e.g., ASG nodes and CSG nodes and their connectivity) to generate a plurality of IGP areas. Method 500 may receive IP RAN network topology information by interrogating a plurality of ASG nodes and/or CSG nodes and/or receiving network information from the plurality of ASG nodes and/or CSG nodes. The network information may include, but is not limited to, a network node identifier, a network node address (e.g., an IP address or a media access control (MAC) address), a routing table, and a network identifier (e.g., a virtual private local area network (VLAN) identifier).

At step 502, method 500 may find one or more valid rings (e.g., a ring as described in FIG. 3). Details on finding valid rings will be discussed in FIG. 6. At step 504, method 500 may find one or more valid chains (e.g., a chain as described in FIG. 3). Finding valid chains will be discussed in FIG. 7. At step 506, method 500 may find one or more ring clusters. A ring cluster may generally comprise a plurality of rings or a ring set and identifying a ring cluster will be described in FIG. 8. At step 508, method 500 may divide the ring clusters that comprise more network nodes than a node threshold M of nodes. Method 500 may recursively cut ring clusters that comprise more network nodes than the node threshold and/or may attempt to minimize the number of shared CSG links. Dividing the ring clusters will be discussed in FIG. 9. At step 510, method 500 may form coarse IGP areas. Forming coarse IGP areas will be discussed in FIG. 13. At step 512, method 500 may perform a global optimization. A global optimization may refer to a partition refinement algorithm, such as, a Kernighan-Lin (KL) partitioning refinement algorithm. Method 500 may switch one or more items (e.g., ASG nodes, CSG nodes, and/or CSG links) between the generated IGP areas to minimize distances between network nodes and/or to minimize the number of shared CSG links.

Figure 6:
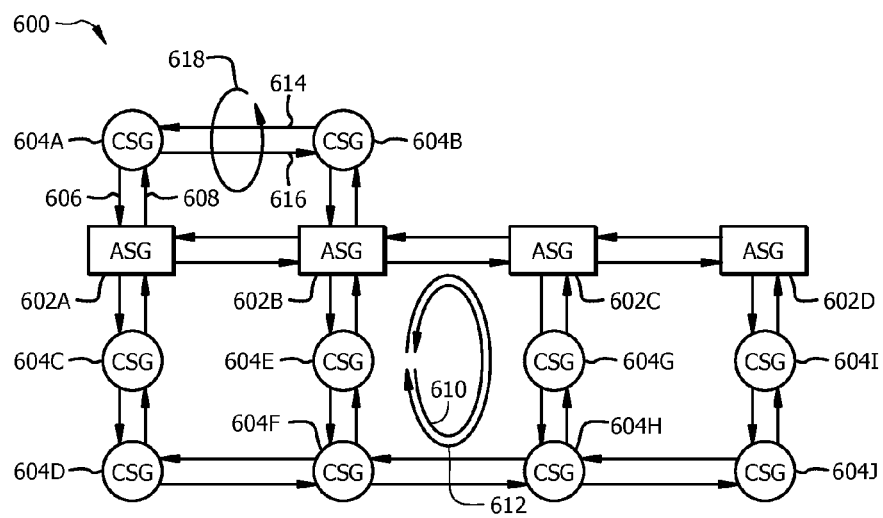
FIG. 6 is a schematic diagram of an example embodiment of a ring search.

FIG. 6 is a schematic diagram of an example embodiment of a ring search 600. A ring search 600 may be implemented to locate one or more rings (e.g., a ring as described in FIG. 3) and to generate a ring set. A ring set may comprise a list of one or more rings. Ring search 600 may reduce the search domain to provide improved performance and/or reduce complexity. Ring search 600 may comprise converting an undirected graph representation of an IP RAN network to a directed graph representation, implementing one or more ring search algorithms, and filtering the directed graph representation. An undirected graph representation may comprise a plurality of CSG links (e.g., CSG link as described in FIG. 3) that connect a plurality of adjacent network nodes but the CSG links may not indicate the data traffic flow directions among the network nodes. A directed graph representation may comprise a plurality of CSG links that connect a plurality of adjacent network nodes and the CSG links may indicate the data traffic flow directions among the network node.

Converting an undirected graph representation graph to a directed graph representation may comprise converting each undirected CSG link between adjacent network nodes (e.g., ASG nodes 602A-602D and/or CSG nodes 604A-604J) to a pair of directional CSG links between the adjacent network nodes. For example, an undirected CSG link between CSG node 604A and ASG node 602A may be converted to a pair of directional CSG links that comprises a first directional CSG link 606 along a first direction and a second directional CSG link 608 along a second direction. The first directional CSG link 606 may flow from CSG node 604A to ASG node 602A and the second directional CSG link 608 may flow from ASG node 602A to CSG node 604A. A ring search algorithm may be implemented on the directed graph representation. The ring search algorithm may include, but may not be limited to, Tiernan's algorithm, Tarjan's algorithm, Johnson's algorithm, or any suitable algorithm to locate one or more rings in a directed graph as would be appreciated by one of ordinary skill in the art upon viewing this disclosure. For example, Tiernan's algorithm may be as described in "An Efficient Search Algorithm to Find the Elementary Circuits of a Graph" by James Tiernan, Tarjan's algorithm may be as described in "Enumeration of the elementary circuits of a directed graph" by Robert Tarjan, and Johnson's algorithm may be as described in "Finding all the elementary circuits of a directed graph" by Donald Johnson, which are all hereby incorporated by reference as if reproduced in their entirety.

Filtering the directional graph representation may comprise removing one or more duplicate rings and/or rings with a distance of two from a ring set. A plurality of directional CSG links between a plurality of adjacent CSG nodes 604A-604J and/or ASG nodes 602A-602D may form one or more directional rings. For example, a first directional ring 610 may comprise a ring flowing through ASG nodes 602B and 602C and CSG nodes 604E-604H in a first direction (e.g., a clockwise direction) and a second directional ring 612 flowing through ASG nodes 602B and 602C and CSG nodes 604E-604H in a second direction (e.g., a counter-clockwise direction). The first directional ring 610 and the second directional ring 612 include the same network nodes (e.g., ASG nodes 602B and 602C and CSG nodes 604E-604H) and may be referred to as duplicates of each other. As such, the first directional ring 610 or the second directional ring 612 may be removed from a ring set. A ring formed between the directional CSG links of adjacent network nodes may have a distance of two CSG links and may be removed from a ring set. A ring 618 may be formed between CSG nodes 604A and 604B using the directional CSG links 614 and 616. Ring 618 may have a distance of two CSG links (e.g., CSG links 614 and 616) and may be removed from a ring set.

Figure 7:
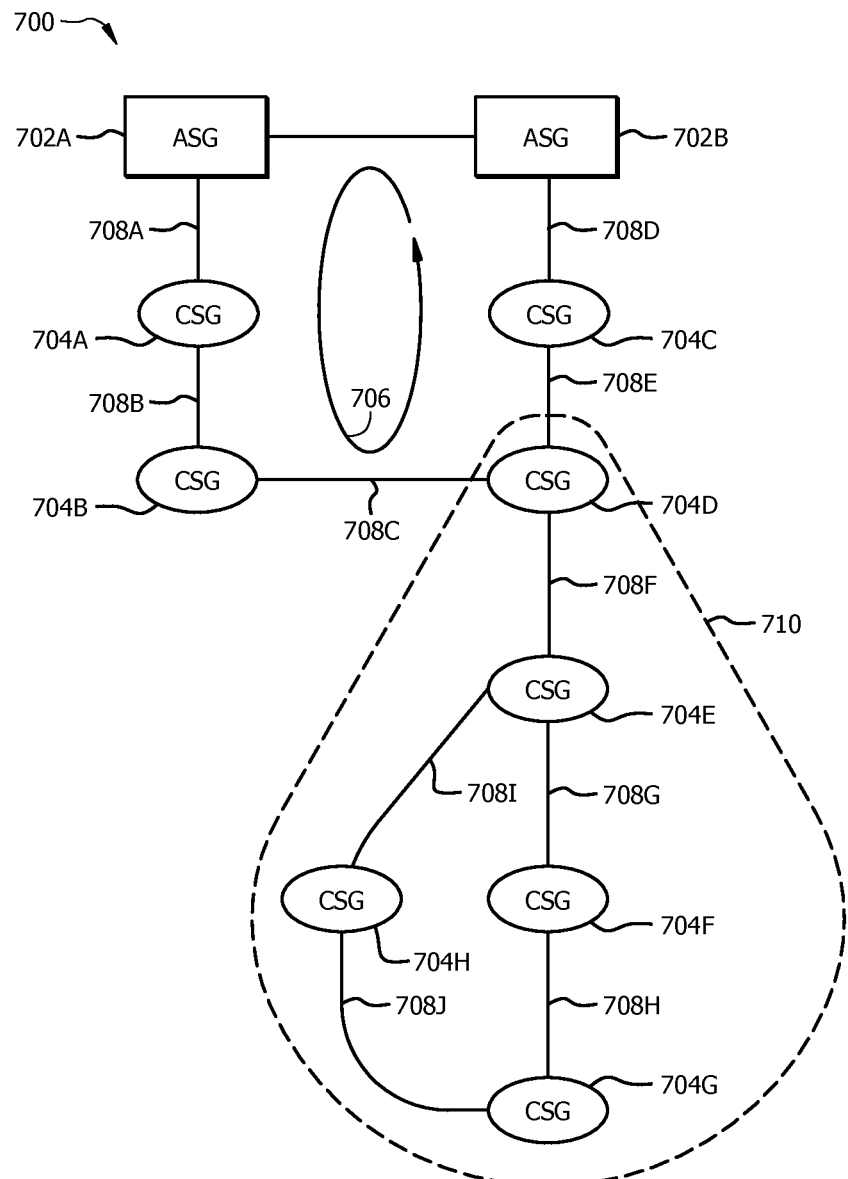
FIG. 7 is a schematic diagram of an example embodiment of a chain search.

FIG. 7 is a schematic diagram of an example embodiment of a chain search 700. A chain search 700 may be implemented to locate one or more chains (e.g., a chain as described in FIG. 3) and to generate a chain set. A chain set may comprise a list of one or more chains. Chain search 700 may comprise identifying network nodes (e.g., ASG nodes 702A and 702B and/or CSG nodes 704A-704H) and/or CSG links outside of a ring set, identifying head nodes, and identifying chains. Identifying network nodes and/or CSG links outside of a ring set may comprise comparing an original graph representation (e.g., an undirected graph representation or a directed graph representation) with a plurality of rings in a ring set (e.g., a ring set as discussed in FIG. 6) to determine remaining network nodes and/or remaining CSG links. The remaining network nodes may be identified and stored in a remaining node list (e.g., $Nodes_{rem} = \{N_1, N_2 \ldots N_k\}$) and/or a remaining CSG link or edge list (e.g., $Edges_{rem} = \{E_1, E_2 \ldots E_m\}$). For example, a ring set may comprise ring 706 that comprises ASG nodes 702A and 702B, CSG nodes 704A-704D, and CSG links 708A-708E. A remaining list node may comprise CSG nodes 704E-704H and a remaining link list may comprise CSG links 708F-708J.

Identifying a head node may comprise comparing the remaining network nodes and/or links with the original graph representation and/or the ring set. A CSG link between a network node in a ring and one or more of the remaining network nodes may indicate the network node in the ring is a head node. Alternatively, a network node that is a member of both a ring and a chain may be a head node. In FIG. 7, CSG node 704D may be determined as a head node.

Identifying a chain may comprise performing a graph or tree search at each head node to determine which of the remaining nodes are associated with a particular chain. A graph or tree search may be a depth-first search which may be an algorithm that traverses and/or searches a tree or graph data structure. A depth-first search may be performed at the head node (e.g., CSG node 704D) to determine the networks nodes (e.g., CSG nodes 704D-704H) and/or the CSG links (e.g., CSG links 708F-708J) associated with a chain 710.

Figure 8:
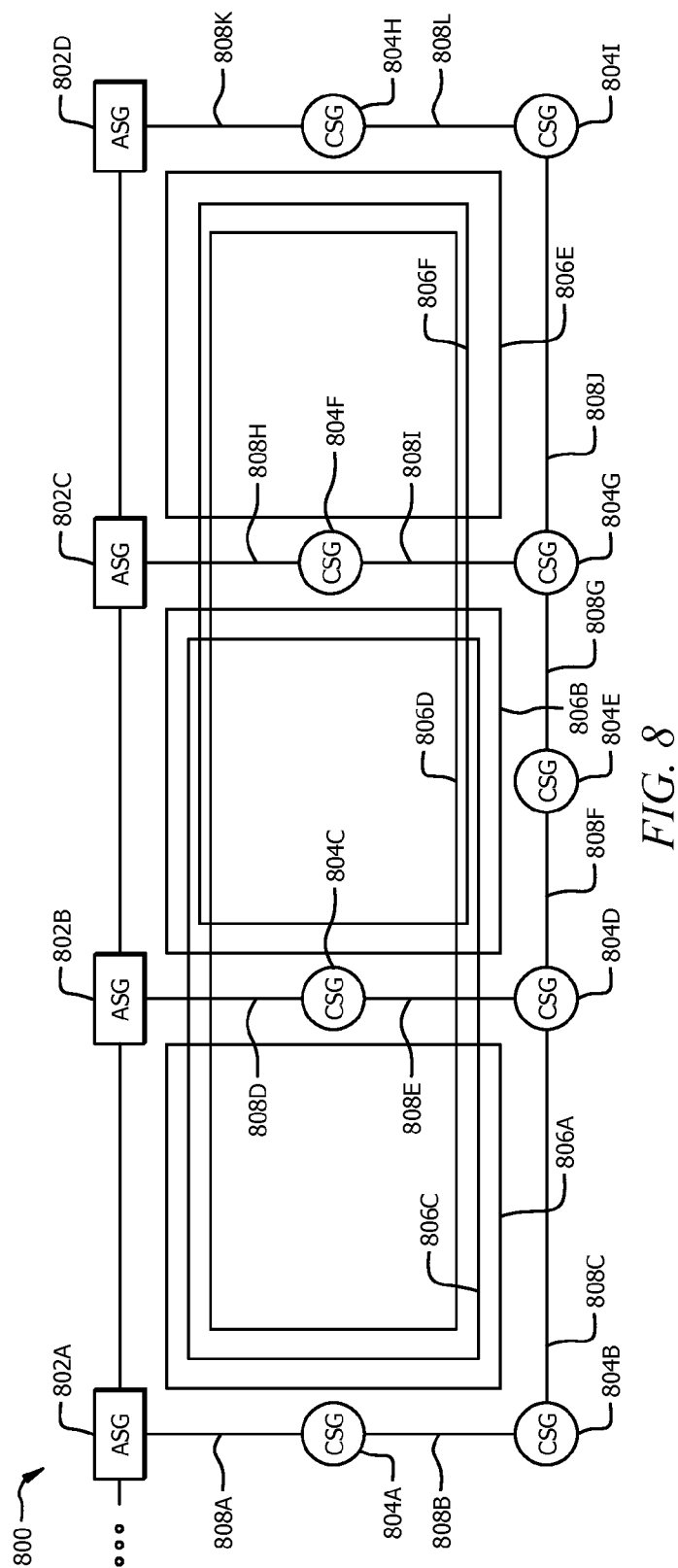
FIG. 8 is a schematic diagram of an example embodiment of a ring cluster.

FIG. 8 is a schematic diagram of an example embodiment of a ring cluster 800. Ring cluster 800 may comprise a plurality of network nodes (e.g., ASG nodes 802A-802D and CSG nodes 804A-804I) and/or a plurality of CSG links (e.g., CSG links 808A-808L). A ring cluster 800 may comprise one or more ring sets (e.g., a ring set as described in FIG. 6) and/or one or more chains sets (e.g., a chain set as described in FIG. 7) that share one or more common CSG links (e.g., a CSG link as described in FIG. 3). Finding a ring cluster 800 may comprise identifying one or more CSG nodes that are coupled to more than two CSG links, merging the rings and/or clusters for the one or more CSG nodes into a ring cluster, and merging ring clusters that share one or more CSG links and/or rings. In FIG. 8, CSG nodes 804D and 804G may be identified as having more than two CSG links. CSG node 804D may be coupled to CSG links 808C, 808E, and 808F and CSG node 804G may be coupled to CSG links 808G, 808I, and 808J. The network nodes identified as having more than two CSG links may be used to identify a plurality of rings associated with a ring cluster. For example, a first ring cluster may be associated with CSG node 804D and may comprise rings 806A-806D and 806F. A second ring cluster may be associated with CSG nodes 804G and may comprise rings 806B-806F. A ring cluster may be merged with another ring that comprises one or more shared or common CSG links and/or rings. The first ring cluster and the second ring cluster each comprise rings 806B-806D and 806F and therefore may share one or more links (e.g., links 808D-808I). As such, the first ring cluster and the second ring cluster may be merged into a single ring cluster.

Figure 9:
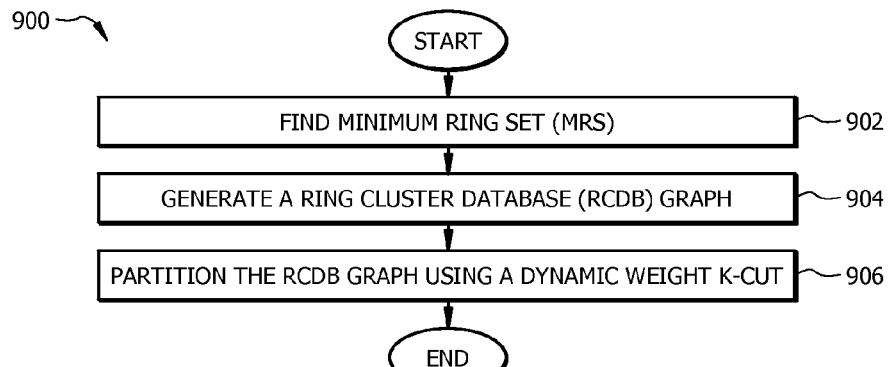
FIG. 9 is a flowchart of an example embodiment of a ring cluster division method.

FIG. 9 is a flowchart of an example embodiment of a ring cluster division method 900. In an example embodiment, method 900 may be implemented in a centralized controller, such as, an SDN controller. In another example embodiment, method 900 may be implemented in an ASG node (e.g., ASG node 103A-103E as described in FIG. 1) or a CSG node (e.g., CSG node 104A-104Z as described in FIG. 1). Method 900 may be implemented to divide one or more ring clusters that exceed a node threshold (e.g., a node threshold M) number of nodes. At step 902, method 900 may find a minimum ring set (MRS). Method 900 may test a plurality of ring combinations among a ring set associated with a ring cluster. Testing a ring combination may comprise determining if a ring combination comprises all of the network nodes (e.g., ASG nodes and/or CSG nodes) within a ring cluster. Finding a MRS may be implemented as will be discussed in FIG. 10. At step 904, method 900 may generate a ring cluster database (RCDB) graph for an MRS. An RCDB graph may comprise a plurality of rings and a plurality of weighted edges interconnecting the plurality of rings. The weight of a weighted edge between a pair of rings may be associated with a number of shared CSG links between the pair of rings. Generating an RCDB graph may be implemented as will be discussed in FIG. 11. At step 906, method 900 may partition the RCDB graph using a dynamic weight k-cut. Method 900 may divide an RCDB graph into a plurality of partitions such that a total weight (e.g., an aggregate weight) of the weighted edges is minimized. Dividing an RCDB graph may be as described in FIG. 12.

Figure 10:
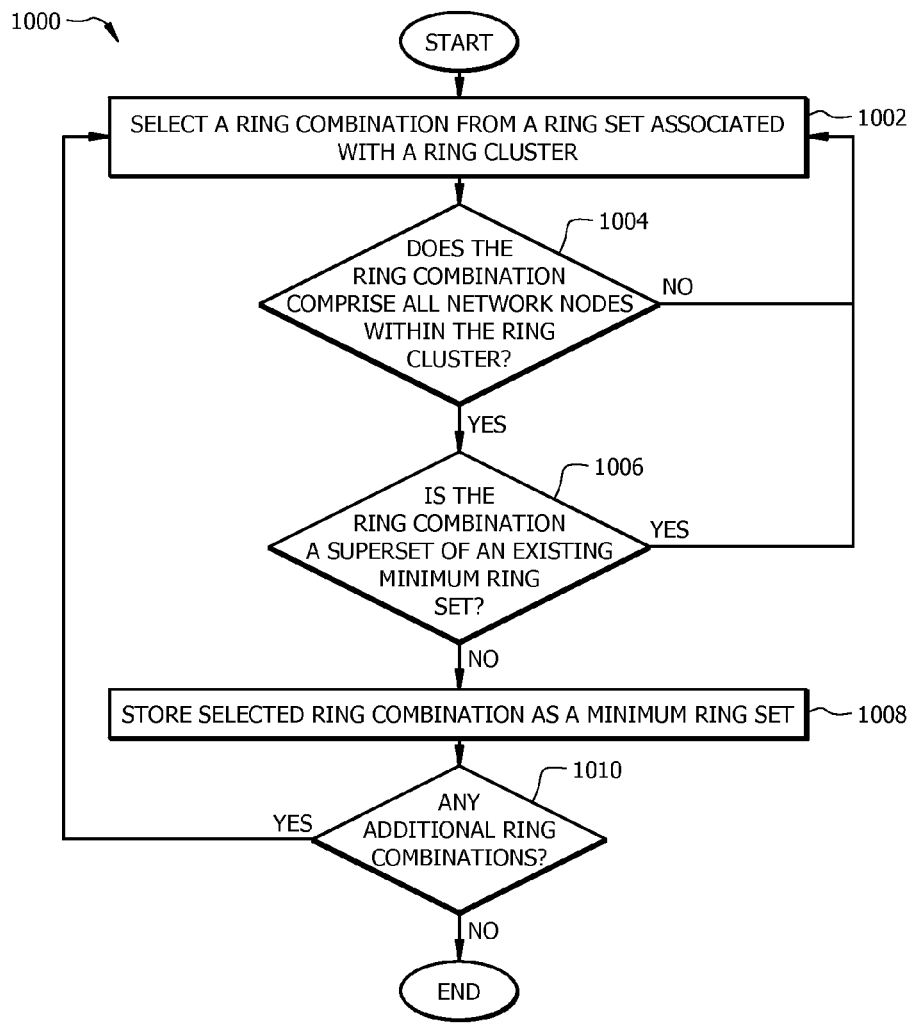
FIG. 10 is a flowchart of an example embodiment of a minimum ring set method.

FIG. 10 is a flowchart of a MRS method 1000. In an example embodiment, MRS method 1000 may be implemented in a centralized controller, such as, an SDN controller. In another example embodiment, MRS method 1000 may be implemented in an ASG node (e.g., ASG node 103A-103E as described in FIG. 1) or a CSG node (e.g., CSG node 104A-104Z as described in FIG. 1). MRS method 1000 may be implemented to find an MRS for a ring cluster (e.g., a ring cluster 800 as described in FIG. 8). At step 1002, MRS method 1000 may select a ring combination from a ring set (e.g., a ring set as described in FIG. 6) associated with a ring cluster. A ring combination may comprise one or more rings from a ring set associated with a ring cluster. For example, a ring combination may comprise any number of rings from about one to about all of the rings of a ring set associated with a ring cluster. At step 1004, MRS method 1000 may determine if the selected ring combination comprises all of the network nodes within the ring cluster. For example, MRS method 1000 may compare the network nodes within the selected ring combination with a list (e.g., a database) of all of the network nodes within the ring cluster. If the selected ring combination comprises all of the network nodes within the ring cluster, then MRS method 1000 may proceed to step 1006, otherwise, MRS method 1000 may return to step 1002 and select a different ring combination.

At step 1006, MRS method 1000 may determine if the selected ring combination is a superset of an existing MRS. Determining if the selected ring combination is a superset of an existing MRS may comprise comparing the selected ring combination with a test ring set. The test ring set may comprise one or more previously selected ring combinations. The selected rings within the ring combination may be compared with the rings within the test ring set. A selected ring combination may be a superset of an existing MRS when all of the rings of the selected ring set appear in the test ring set. A selected ring combination may not be a superset of an existing MRS when one or more of the rings of the selected ring set do not appear in the test ring set. When a test ring set is unavailable or there are no previously selected ring combinations, the selected ring combination may not be a superset of the test ring set and the selected ring combination may be stored as the test ring set. If the selected ring combination is a superset of an existing MRS, then MRS method 1000 may return to step 1002 and select a different ring combination, otherwise, MRS method 1000 may proceed to step 1008. One or more possible ring combinations may be removed upon determining a selected ring combination is a superset of an existing MRS. At step 1008, MRS method 1000 may store the selected ring combination as a MRS for the ring cluster. At step 1010, MRS method 1000 may determine if any additional ring combinations need to be tested. If there are additional ring combinations to be tested, then MRS method 1000 may return to step 1002 and select a different ring combination, otherwise, MRS method 1000 may terminate.

Figure 11:
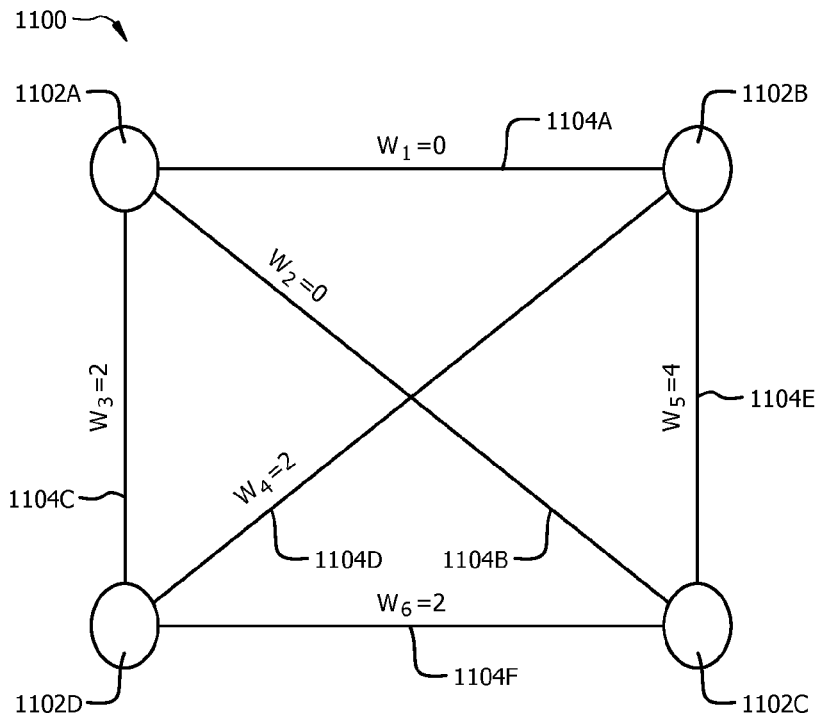
FIG. 11 is a schematic diagram of an example embodiment of a ring cluster database graph.

FIG. 11 is a schematic diagram of an example embodiment of a ring cluster database graph 1100. RCDB graph 1100 may comprise a plurality of rings 1102A-1102D (e.g., a ring as described in FIG. 3) and a plurality of weighted edges 1104A-1104F interconnecting the plurality of rings 1102A-1102D. Each ring may not exceed a node threshold (e.g., a node threshold M) number of nodes. The weight of a weighted edge between a pair of rings may be associated with a number of shared CSG links between the pair of rings. For example, RCDB graph 1100 may comprise a first weighted edge 1104A with a weight of about zero between ring 1102A and 1102B, a second weighted edge 1104B with a weight of about zero between ring 1102A and 1102C, a third weighted edge 1104C with a weight of about two between rings 1102A and 1102D, a fourth weighted edge 1104D with a weight of about two between rings 1102D and 1102B, a fifth weighted edge 1104E with a weight of about four between rings 1102B and 1102C, and a sixth weighted edge 1104F with a weight of about two between rings 1102D and 1102C.

Figure 12:
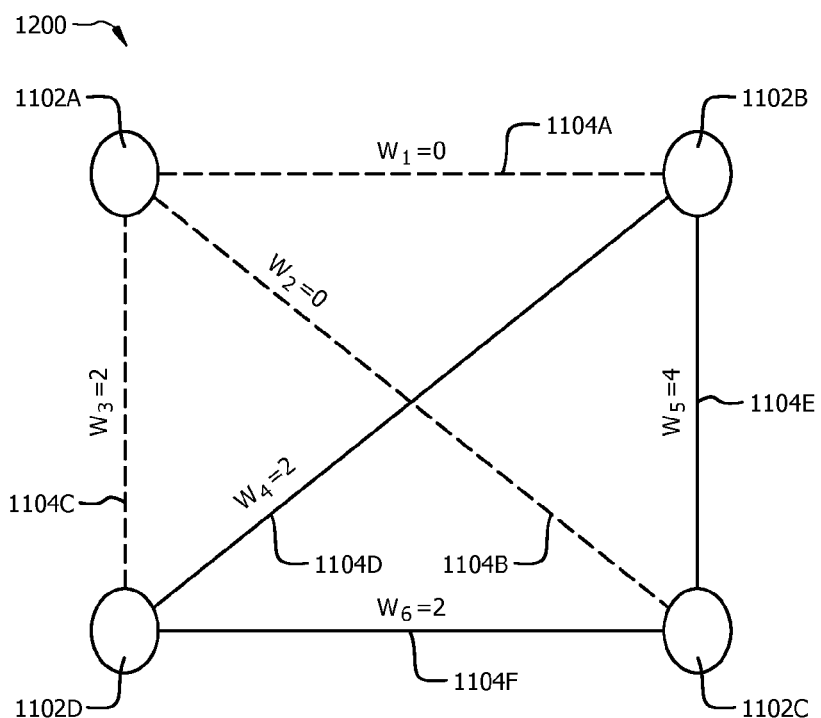
FIG. 12 is a schematic diagram of an example embodiment of a divided ring cluster database graph.

FIG. 12 is a schematic diagram of example embodiment of a divided RCDB graph 1200. Divided RCDB graph 1200 may initially comprise a topology substantially similar to the RCDB graph 1100 as described in FIG. 11. A divided RCDB graph 1200 may be configured such that the total weight of the weighted edges that connect the partitions of the divided RCDB graph 1200 is minimized. The divided RCDB graph 1200 may be generated by dividing an RCDB graph (e.g., RCDB graph 1100 as described in FIG. 11) using a minimum k-cut algorithm. A minimum k-cut algorithm may be a combinatorial optimization problem that finds a set of edges (e.g., weighted edges) whose removal may partition the graph into k-connected components. The set of edges may be referred to as k-cut. As such, the goal may be to determine a minimum-weight k-cut. A dynamic weight minimum k-cut may enhance a minimum k-cut. A dynamic weight minimum k-cut may be as described in "Approximation algorithms for minimum K-cut" by N. Guttmann-Beck, et al., and "Greedy algorithms for k-way graph partitioning" by Sachin Jain, et al., which are both hereby incorporated by reference as if reproduced in their entirety. The weight of the weighted edges 1104A-1104F may be the number of shared CSG links (e.g., CSG links as described in FIG. 3) between adjacent rings 1102A-1102D. Network nodes (e.g., ASG nodes 103A-103E and/or CSG nodes 104A-104Z as described in FIG. 1) and/or shared CSG links on an RCDB graph may be duplicated. After every k-cut, the weights of the weighted edges 1104A-1104F may be adjusted. Any suitable algorithm (e.g., k-cut algorithm) for dividing the RCDB graph based on its weighted links may be employed as would be appreciated by one of ordinary skill in the art upon viewing this disclosure.

In an embodiment, a Greedy algorithm maybe implemented to perform a dynamic weight minimum k-cut. One or more weighted edges with the lowest relative weight may be cut (e.g., removed), for example, weighted edges 1104A-1104C. The number of network nodes in the resulting partitions may be determined following a dynamic weight minimum k-cut. Duplicate network nodes and/or CSG shared links with the partitions may be removed. A dynamic weight minimum k-cut may be repeated, as necessary, to meet one or more IGP requirements. For example, a dynamic weight minimum k-cut may be repeated one or more times to meet an IGP node threshold requirement. In an alternative embodiment, any other suitable minimum k-cut algorithm may be employed as would be appreciated by one of ordinary skill in the art upon viewing this disclosure.

Figure 13:
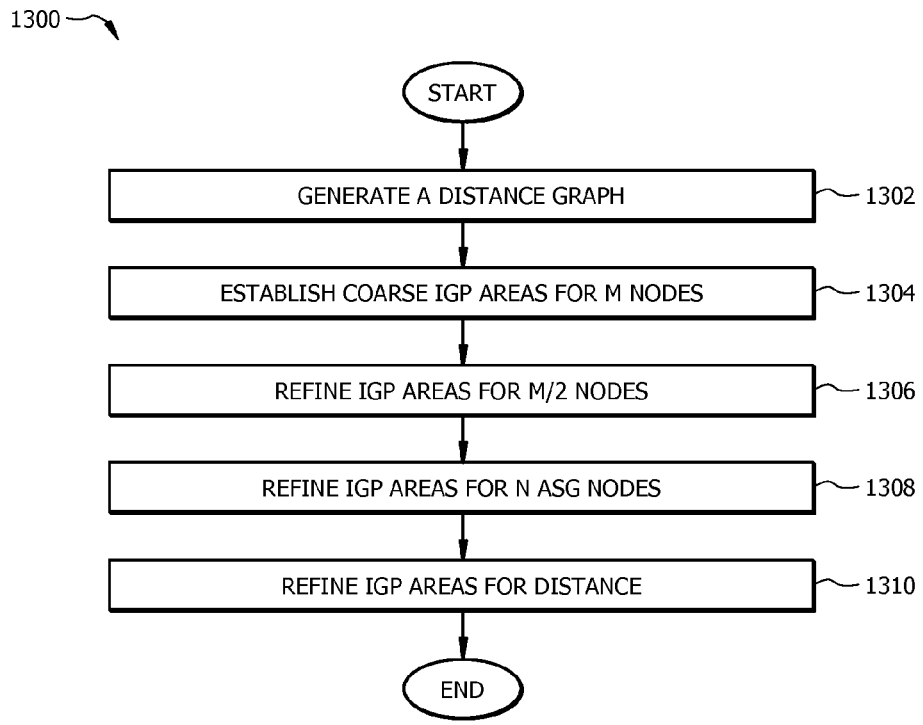
FIG. 13 is a flowchart of an example embodiment of a coarse partitioning method.

FIG. 13 is a flowchart of an example embodiment of a coarse partitioning method 1300. In an example embodiment, method 1300 may be implemented in a centralized controller, such as, an SDN controller. In another example embodiment, method 1300 may be implemented in an ASG node (e.g., ASG node 103A-103E as described in FIG. 1) or a CSG node (e.g., CSG node 104A-104Z as described in FIG. 1). Method 1300 may be implemented to form a plurality of IGP areas by partitioning one or more IGP areas to minimize the total weight of internal edges or links in each partition while each partition satisfies one or more IGP area requirements. For example, a network operator may establish one or more IGP requirements that comprises a first node threshold requirement that each IGP area comprises up to about a node threshold M number of network nodes (e.g., CSG nodes and ASG nodes) or fewer. Also, each IGP area may be required to comprise at least N (e.g., about two or more) number of ASG nodes. Network nodes may maintain locality in an original topology by grouping network nodes with shorter distances between the network nodes.

At step 1302, method 1300 may generate a distance graph. A distance graph may be employed to describe a relationship between a plurality of rings and/or chains in terms of distance (e.g., number of hops) and/or may be employed to partition an IGP area into a plurality of IGP zones or partitions. A distance graph may be generated using a plurality of zone elements (e.g., ring clusters) which will be discussed in FIG. 14. At step 1304, method 1300 may establish coarse IGP areas for the node threshold. Method 1300 may identify a weighted edge (e.g., a zone element weighted edge) having a pair of vertices (e.g., zone elements) with a largest weight in the distance graph. A zone element and a zone element edge will be described in FIG. 14. Method 1300 may select a zone element from a pair of zone elements that is coupled to a second zone element edge with a smaller weight and may reassign the zone element within a new partition. One or more adjacent zone elements may also be reassigned within the new IGP areas while satisfying IGP requirements (e.g., a node threshold and/or an ASG node requirement). Step 1304 may be repeated one or more times, as needed, to satisfy one or more IGP requirements. For example, step 1304 may be repeated until a majority of the IGP areas comprise less than or about the node threshold number of nodes.

At step 1306, method 1300 may refine one or more IGP areas that comprise less than about half of the node threshold requirement. Method 1300 may refine one or more IGP areas to meet an IGP node requirement such that the total number of network nodes in each IGP area may be from about half of the node threshold number of nodes (e.g., M/2) to about the node threshold number of nodes (e.g., M). Refining one or more IGP areas that comprise less than about half of the node threshold requirement may be implemented as will be discussed in FIG. 15. At step 1308, method 1300 may refine one or more IGP areas for N number of ASG nodes. Method 1300 may refine one or more IGP areas to meet an ASG node requirement such that the number of ASG nodes in each IGP area is at least about N. Refining one or more IGP areas for N number of ASG nodes may be implemented as will be discussed in FIG. 16.

At step 1310, method 1300 may refine one or more IGP areas for distance. Method 1300 may refine one or more IGP areas to reduce the sum of edge weights within the one or more IGP areas. Method 1300 may select an IGP area and may swap one or more zone elements if both IGP areas meet the IGP node requirement and the ASG node requirement and the total weight of the internal edges in both IGP areas may be reduced. In one example embodiment, a priority may be associated with the total weight reduction. For example, a higher priority may correspond with a larger total weight reduction. Additional considerations may be used to select which zone elements may be swapped. For example, factors such as reducing the overall number of shared links or selecting a zone element that yields a smaller minor distance (e.g., minor distance as described ion FIG. 14.) may also be considered. In an example embodiment, method 1300 may utilize a constraint Kernighan-Lin refinement algorithm to implement steps 1306-1310. Alternatively, method 1300 may utilize any other suitable algorithm as would be appreciated by one of ordinary skill in the art upon viewing this disclosure.

Figure 14:
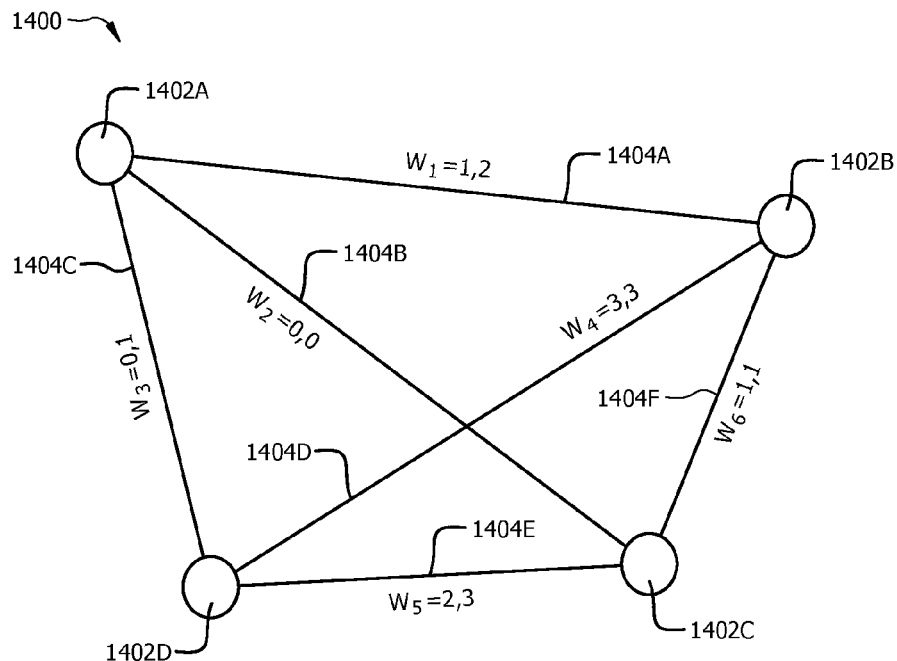
FIG. 14 is a schematic diagram of an example embodiment of a distance graph.

FIG. 14 is a schematic diagram of an example embodiment of a distance graph 1400. Distance graph 1400 may be employed to describe a portion of a network, a relationship between a plurality of ring clusters, rings and/or chains in terms of distance (e.g., number of hops), and/or may be employed to partition an IGP area into a plurality of IGP areas. A distance graph may be a function of a set of zone elements and a set of zone element edges with a zone element distance that corresponds with the weight of a zone element edge. Distance graph 1400 comprises a plurality of zone elements 1402A-1402D and a plurality of zone element edges 1404A-1404F. A ring cluster (e.g., ring cluster 800 as described in FIG. 8) may be referred to as a zone element when the ring cluster comprises no more than M number of nodes. Alternatively, when a ring cluster comprises more than M number of nodes, then each partition from a ring cluster cut may be referred to as a zone element.

An ASG distance may refer to the shortest number of hops between a pair of ASG nodes (e.g., ASG nodes 103A-103E as described in FIG. 1) on an aggregation ring. A zone element distance may refer to a ASG distance between any pair of ASG nodes within two zone elements and may indicate a minimum number of hops between a pair of ASG node in a first direction (e.g., a first zone element distance) and a second direction (e.g., a second zone element distance) along an aggregation ring. The smaller zone element distance may be referred to as a zone element major distance and the other zone element distance may be referred to as a zone element minor distance. A zone element major distance may be used to minimize the number of ASG hops between zone elements. A zone element minor distance may be used as a tie breaker to further minimize the number of ASG hops between zone elements. When a zone element comprises a single ASG node (e.g., a head ASG node), the zone element major distance and zone element minor distance may be about equal. The weight of a zone element edge 1404A-1404F may comprise an associated zone element minor distance and zone element major distance. For example, the zone element major distance may be indicated as a first value (e.g., a value of one for zone element edge 1404A) and the zone element minor distance may be indicated by a second value (e.g., a value of two for zone element edge 1404A). A distance graph may correspond with a portion of the network. For example, distance graph 1400 may correspond with a portion of a network 400 as described in FIG. 4. In such an example, zone element 1402A may correspond with rings 406B-406D as shown in FIG. 4, zone element 1402B may correspond with ring 406E as shown in FIG. 4, zone element 1402C may correspond with chain 408 as shown in FIG. 4, and zone element 1402D may correspond with ring 406A as shown in FIG. 4.

Figure 15:
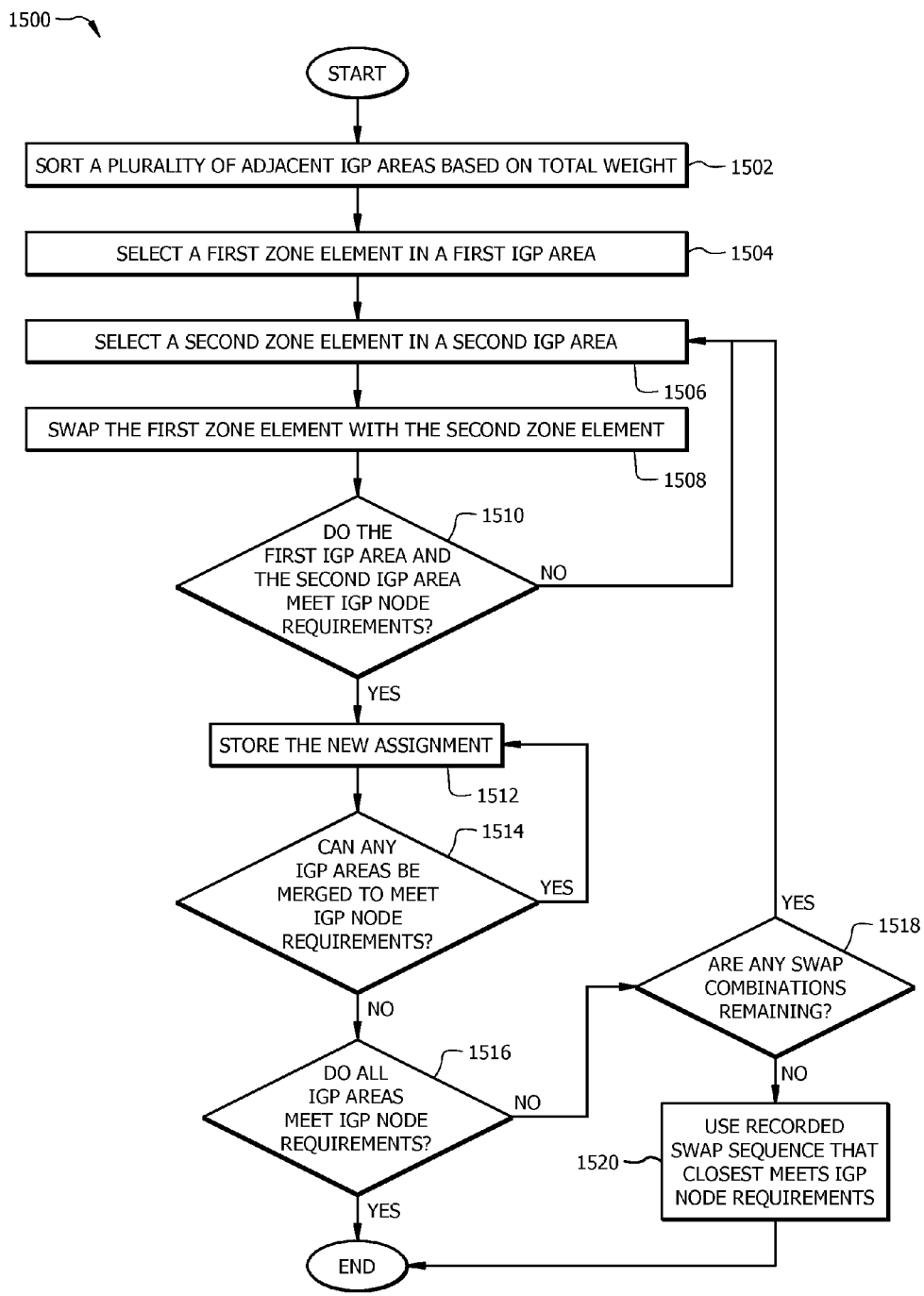
FIG. 15 is a flowchart of an example embodiment of an IGP area refinement method.

FIG. 15 is a flowchart of an example embodiment of an IGP area refinement method 1500. In an example embodiment, method 1500 may be implemented in a centralized controller, such as, an SDN controller. In another example embodiment, method 1500 may be implemented in an ASG node (e.g., ASG node 103A-103E as described in FIG. 1) or a CSG node (e.g., CSG node 104A-104Z as described in FIG. 1). In one example embodiment, method 1500 may be implemented using a depth-first search to refine one or more IGP areas to meet an IGP node requirement. For example, the IGP node requirement may require that the total number of network nodes in each IGP area may be from about half of the node threshold number of nodes (e.g., M/2) to about the node threshold number of nodes (e.g., M). At step 1502, method 1500 may sort a plurality of adjacent IGP areas based on their total weight. At step 1504, method 1500 may select a first zone element in a first IGP partition that comprises less than about half of the node threshold number of node. At step 1506, method 1500 may select a second zone element in a second (e.g., adjacent) IGP area. At step 1508, method 1500 may swap the first zone element and the second zone element. The first zone element may be moved from the first IGP area to the second IGP area and the second zone element may be moved from the second IGP area to the first IGP area.

At step 1510, method 1500 may determine if the first IGP area and the second IGP area comprise between about half of the node threshold number of nodes to about the node threshold number of network nodes (e.g., M) and therefore, meet the IGP node requirement. If the first IGP area and the second IGP area comprise between about half of the node threshold number of nodes to about the node threshold number of network nodes then method 1500 may proceed to step 1512, otherwise, method 1500 may return to step 1506. At step 1512, method 1500 may store the assignment of the first zone element to the second IGP area and the second zone element to the first IGP area. At step 1514, method 1500 may determine if one or more IGP areas may be merged with each other to meet the IGP node requirement. If one or more of the IGP areas can be merged then method 1500 may return to step 1512, otherwise, method 1500 may proceed to step 1516.

At step 1516, method 1500 may determine if the IGP areas meet the IGP node requirement. If the IGP areas meet the IGP node requirement then method 1500 may terminate, otherwise, method 1500 may proceed to step 1518. At step 1518, method 1500 may determine if there are any remaining zone element swap combinations for the IGP areas. If there are remaining zone element swap combinations for the IGP areas then method 1500 may return to step 1506, otherwise, method 1500 may proceed to step 1520. At step 1520, method 1500 may use a recorded swap sequence that closest meets the IGP node requirement.

Figure 16:
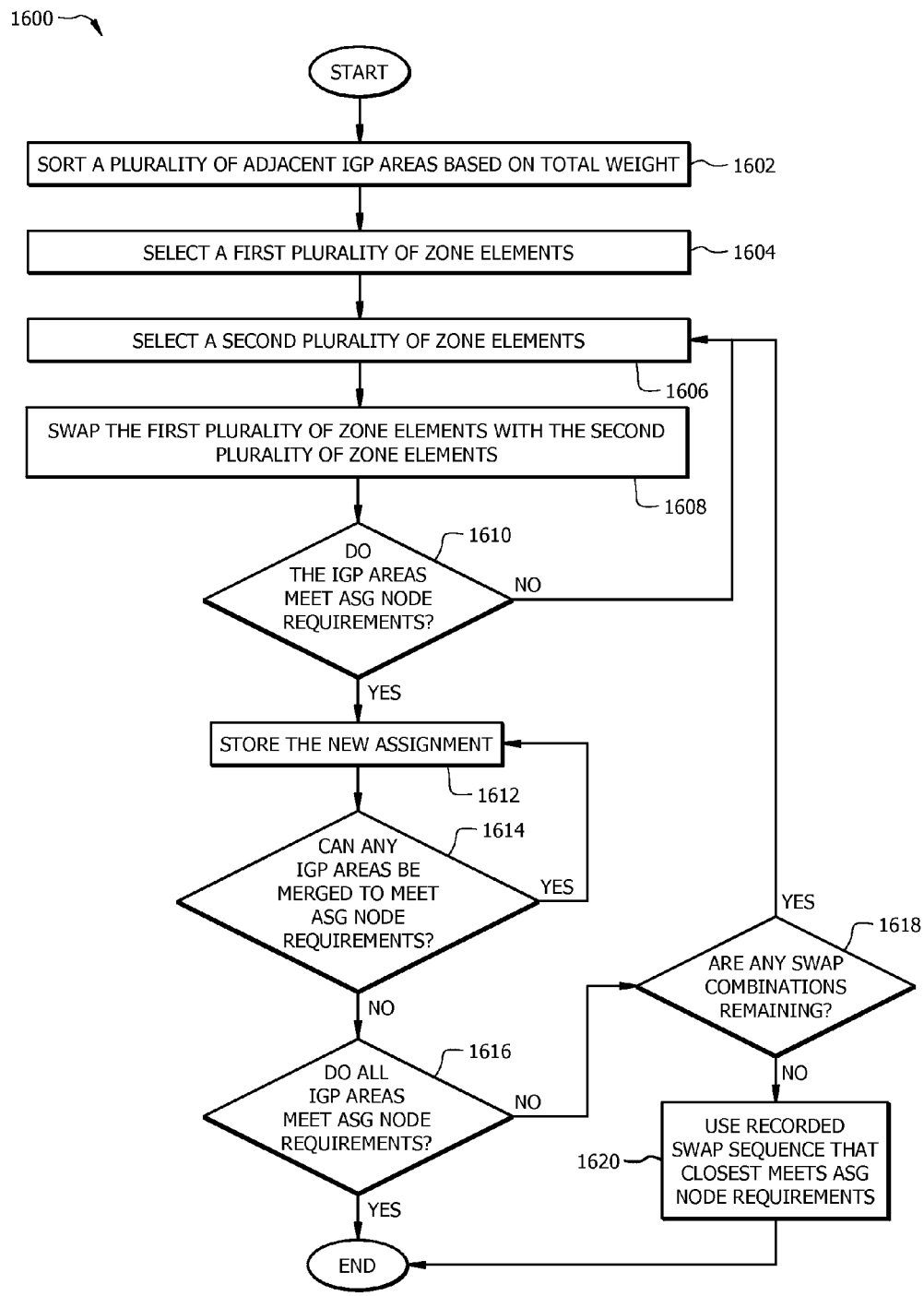
FIG. 16 is a flowchart of another example embodiment of an IGP area refinement method.

FIG. 16 is a flowchart of another example embodiment of an IGP area refinement method 1600. In an example embodiment, method 1600 may be implemented in a centralized controller, such as, an SDN controller. In another example embodiment, method 1600 may be implemented in an ASG node (e.g., ASG node 103A-103E as described in FIG. 1) or a CSG node (e.g., CSG node 104A-104Z as described in FIG. 1). In one example embodiment, method 1600 may be implemented using a depth-first search to refine one or more IGP areas to meet an ASG node requirement. For example, the ASG node requirement may require that the total number of ASG nodes in each IGP area may be at least an ASG node threshold (e.g., N) number of ASG nodes (e.g., two ASG nodes). At step 1602, method 1600 may sort a plurality of adjacent IGP areas. The IGP areas may be sorted and/or prioritized based on their total internal weight, the impact on the number of ASG nodes in the IGP areas, or any other suitable criteria as would be appreciated by one of ordinary skill in the art upon viewing this disclosure. At step 1604, method 1600 may select a first plurality of zone elements (e.g., a zone element as described in FIG. 14). At step 1606, method 1600 may select a second plurality of zone elements. The first plurality of zone elements and/or the second plurality of zone elements may comprise zone elements from one or more adjacent IGP areas. At step 1608, method 1600 may swap the first plurality of zone elements and the second plurality of zone elements.

At step 1610, method 1600 may determine if the IGP areas comprise at least an ASG node threshold (e.g., N) number of ASG nodes, and therefore, meet the ASG node requirement. If the IGP areas meet the ASG node requirement then method 1600 may proceed to step 1612, otherwise, method 1600 may return to step 1606. At step 1612, method 1600 may store the assignment of the first plurality of zone elements and the second plurality of zone elements. At step 1614, method 1600 may determine if one or more IGP areas may be merged with each other to meet the ASG node requirement. If one or more of the IGP areas can be merged then method 1600 may return to step 1612, otherwise, method 1600 may proceed to step 1616.

At step 1616, method 1600 may determine if the IGP areas meet the ASG node requirement. If the IGP areas meet the ASG node requirement then method 1600 may terminate, otherwise, method 1600 may proceed to step 1618. At step 1618, method 1600 may determine if there are any remaining zone element swap combinations for the IGP areas. If there are remaining zone element swap combinations for the IGP areas then method 1600 may return to step 1606, otherwise, method 1600 may proceed to step 1620. At step 1620, method 1600 may use a recorded swap sequence that closest meets the ASG node requirement.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. In a network component, a method for partitioning an internet protocol (IP) radio access network (RAN) network, the method comprising:
    finding one or more rings and one or more chains using network topology information corresponding to the IP RAN network;
    finding one or more ring clusters that comprises a plurality of network nodes using the rings and the chains;
    dividing the ring clusters that exceed a network node threshold number of network nodes;
    forming a plurality of interior gateway protocol (IGP) areas using the ring clusters; and refining one or more of the IGP areas based on one or more IGP area requirements, wherein the network nodes comprise a plurality of aggregate site gateway (ASG) nodes and a plurality of cell site gateway (CSG) nodes, and
    wherein the IP RAN network comprises one or more rings;
    wherein dividing one of the ring clusters comprises:
    finding a ring set for one or more of the ring clusters;
    generating a ring cluster database (RCDB) graph using the ring set; and
    partitioning the RCDB graph using a dynamic k-cut algorithm.

2. The method of claim 1, wherein finding the minimum ring set for one or more of the ring clusters comprises:
    selecting a ring combination from the ring set that is associated with a first ring cluster;
    determining the ring combination comprises the network nodes associated with the first ring cluster;
    determining the ring combination is not a superset of an existing minimum ring set; and
    storing the ring combination as a minimum ring set entry for the first ring cluster.

3. The method of claim 1, wherein forming the IGP areas comprises:
    generating a distance graph using a plurality of the IGP areas; and
    establishing one or more IGP areas using the distance graph such that the IGP areas comprise less than the network node threshold number of network nodes,
    wherein the distance graph comprise a plurality of weighted edges that correspond with a number of hops between the ASG nodes of the plurality of IGP areas.

4. The method of claim 1, wherein refining the IGP areas comprises reassigning one or more zone elements such that the IGP areas comprise less than the network node threshold number of network nodes and more than half of the network node threshold number of network nodes, and wherein the zone elements each comprise one or more rings.

5. The method of claim 1, wherein refining the IGP areas comprises reassigning one or more zone elements such that the IGP areas comprises at least two ASG nodes, and wherein the zone elements each comprise one or more rings.

6. The method of claim 1, wherein refining the IGP areas comprises reducing a distance between the network nodes within the IGP areas.

7. The method of claim 1, wherein the IGP area requirements comprises the network node threshold and an ASG node threshold, wherein the network node threshold is a maximum number of network nodes for the IGP areas, and wherein the ASG node threshold is a minimum number of ASG nodes for the IGP areas.

8. The method of claim 1, wherein the rings each comprise a pair of ASG nodes and a plurality of CSG nodes along a path between the pair of ASG nodes.

9. The method of claim 1, wherein the chains each comprise a head node coupled to a plurality of CSG nodes.

10. The method of claim 9, wherein the head node is a network node that connects the plurality of CSG nodes with one or more network topology structures.

11. The method of claim 1, wherein the ASG nodes are configured to connect one or more of the CSG nodes to a central office, and wherein the CSG nodes are configured to connect one or more users to the ASG nodes.

12. A computer program product comprising computer executable instructions stored on a non-transitory computer readable medium that when executed by a processor causes a network device to perform the following:
    find one or more ring clusters that comprises a plurality of network nodes within an internet protocol (IP) radio access network (RAN) network;
    partition the ring clusters that exceed a maximum number of network nodes designated for the ring clusters;
    form a plurality of interior gateway protocol (IGP) areas using the ring clusters; and
    refine the IGP areas based on a network node threshold and an aggregate site gateway (ASG) node threshold,
    wherein the network node threshold is the maximum number of network nodes for the IGP areas,
    wherein the ASG node threshold is a minimum number of ASG nodes for the IGP areas, and
    wherein the network nodes comprise a plurality of ASG nodes and a plurality of cell site gateway (CSG) nodes,
    wherein the computer executable instructions, when executed by the processor, further cause the network device to:
    find a minimum ring set for one or more of the ring clusters;
    generate a ring cluster database (RCDB) graph using the minimum ring set; and
    partition the RCDB graph using a dynamic k-cut algorithm.

13. The computer program product of claim 12, wherein the computer executable instructions, when executed by the processor, cause the network device to:
    generate a distance graph using a plurality of the IGP areas; and
    establish one or more IGP areas using the distance graph such that the IGP areas comprise less than the network node threshold number of network nodes.

14. The computer program product of claim 12, wherein the computer executable instructions, when executed by the processor, cause the network device to:
    reassign one or more zone elements such that the IGP areas comprise less than the network node threshold number of network nodes and more than half of the network node threshold number of network nodes;
    reassign one or more zone elements such that the IGP areas comprises at least two ASG nodes; and
    reduce a distance between the network nodes within the IGP areas.

15. An apparatus comprising:
    a receiver configured to receive a network topology information for an internet protocol (IP) radio access network (RAN) network;
    a processor couple to a memory device and the receiver, wherein the memory comprises computer executable instructions stored in a non-transitory computer readable medium such that when executed by the processor causes the processor to:

find one or more ring clusters that comprises a plurality of network nodes using one or more rings and one or more chains;
find a minimum ring set for the ring clusters;
construct a ring cluster database (RCDB) graph using the minimum ring set; and
partition the RCDB graph using a dynamic k-cut algorithm;
form a plurality of interior gateway protocol (IGP) areas using the ring clusters; and
refine one or more of the IGP areas based on a network node threshold and an aggregate site gateway (ASG) node threshold; and
a transmitter coupled to the processor, wherein the transmitter is configured to communicate topology information about the IGP areas,
wherein the network node threshold is a maximum number of network nodes for the IGP areas,
wherein the ASG node threshold is a minimum number of ASG nodes for the IGP areas, and
wherein the network nodes comprise a plurality of ASG nodes and a plurality of cell site gateway (CSG) nodes.

16. The apparatus of claim 15, wherein the computer executable instructions, when executed by the processor, cause the processor to:
generate a distance graph using a plurality of the IGP areas; and
establish one or more IGP areas using the distance graph such that the IGP areas comprise less than the network node threshold number of network nodes.

17. The apparatus of claim 15, wherein the computer executable instructions, when executed by the processor, cause the processor to:
reassign one or more zone elements such that the IGP areas comprise less than the network node threshold number of network nodes and more than half of the network node threshold number of network nodes; and
reassign one or more zone elements such that the IGP areas comprises at least two ASG nodes.

18. The apparatus of claim 15, wherein the computer executable instructions, when executed by the processor, cause the processor to reduce a distance between the network nodes within the IGP areas.

* * * * *